United States Patent
Brown (10) Patent No.: US 9,242,269 B2
(45) Date of Patent: Jan. 26, 2016

(54) SYSTEM AND METHOD FOR EXTENDING THE SERVICE LIFE OF CONCRETE STRUCTURES

(71) Applicant: Advanced Chemical Technologies, Inc., Oklahoma City, OK (US)

(72) Inventor: Kevin M. Brown, Edmond, OK (US)

(73) Assignee: Advanced Chemical Technologies, Inc., Oklahoma City, OK (US)

( * ) Notice: Subject to any disclaimer, the term of this patent is extended or adjusted under 35 U.S.C. 154(b) by 4 days.

(21) Appl. No.: 14/180,486

(22) Filed: Feb. 14, 2014

(65) Prior Publication Data

US 2014/0314961 A1  Oct. 23, 2014

Related U.S. Application Data

(60) Provisional application No. 61/779,044, filed on Mar. 13, 2013.

(51) Int. Cl.

| | | |
|---|---|---|
| *B05D 1/36* | (2006.01) | |
| *B05D 5/00* | (2006.01) | |
| *B05D 7/00* | (2006.01) | |
| *C09D 5/08* | (2006.01) | |
| *C09D 163/00* | (2006.01) | |

(52) U.S. Cl.
CPC .. *B05D 1/36* (2013.01); *B05D 5/00* (2013.01); *B05D 7/00* (2013.01); *B05D 7/52* (2013.01); *C09D 5/08* (2013.01); *C09D 163/00* (2013.01); *B05D 2203/30* (2013.01); *B05D 2518/10* (2013.01)

(58) Field of Classification Search
None
See application file for complete search history.

(56) References Cited

U.S. PATENT DOCUMENTS 4,342,796 A * 8/1982 Brown .................. C04B 41/009
427/136
2010/0092664 A1 * 4/2010 Palushaj ............... C09D 133/14
427/243

FOREIGN PATENT DOCUMENTS

RU    2 155 736 C1 * 10/2000

OTHER PUBLICATIONS

The Constructor, Methods of concrete crack repair, http://theconstructor.org/concrete/methods-of-crack-repair/886/, pp. 1-8, 2012.
Radonseal, Comparison of Concrete Sealants, www.radonseal.com/concrete_sealer.htm, pp. 1-2, 2013.
41 Siloxane Sealer, Epoxy.com Product #41 Silane-Siloxane Penetrating Sealer, www.epoxysystems.com/41.htm, pp. 1-4, 2013.

* cited by examiner

*Primary Examiner* — William Phillip Fletcher, III
(74) *Attorney, Agent, or Firm* — Dunlap Codding, P.C.

(57) ABSTRACT

A cost-effective process for treating a concrete structure includes the following steps. A surface of the concrete structure is coated with an organo-silicon compound and the organo-silicon coated surface is covered so as to reduce atmospheric exposure of the organo-silicon compound while the organo-silicon compound migrates into the concrete structure.

23 Claims, 7 Drawing Sheets

FIG. 1

Block #4
60 Days
Silane Applied: 0.87 g
No Epoxy
Penetration: 11.15 mm

Block #5
60 Days
Silane Applied: 0.90 g
No Epoxy
Penetration: 12.18 mm

Block #6
60 Days
Silane Applied: 0.87 g
No Epoxy
Penetration: 11.11 mm

Average Penetration: 11.48mm

FIG. 2A

Block #16
60 Days
Silane Applied: 0.87 g
Epoxy Added
Penetration: 15.52 mm

Block #17
60 Days
Silane Applied: 0.87 g
Epoxy Added
Penetration: 15.68 mm

Block #18
60 Days
Silane Applied: 0.87 g
Epoxy Added
Penetration: 15.24 mm

Average Penetration: 15.48mm

SYSTEM AND METHOD FOR EXTENDING THE SERVICE LIFE OF CONCRETE STRUCTURES

INCORPORATION BY REFERENCE

The entirety of U.S. Provisional Application Ser. No. 61/779,044 filed Mar. 13, 2013, is hereby expressly incorporated herein by reference.

BACKGROUND OF THE INVENTIVE CONCEPTS

1. Field of the Inventive Concepts

The presently claimed and disclosed inventive concepts relate generally to methods for inhibiting deterioration of concrete structures and, more particularly, but not by way of limitation, to systems and methods for inhibiting corrosion of internal structural members of reinforced concrete structures.

2. Brief Description of Related Art

The cost for repair of highway infrastructure is very high and the problem is of greatest magnitude on bridge decks which are subject to frequent applications of deicing salt. Deterioration of reinforced concrete structures, such as bridge decks, parking garages and concrete paved roadways, occurs in large part because of corrosion of the reinforcing steel members of the structure as a result of salt migration into the structure. Penetration of water into cracks, followed by freeze-thaw cycles further degrades concrete and masonry structures and reduces the service life of the structures.

Water repellency has been provided by treating concrete and masonry surfaces to render them repellant to liquid water. Many different compositions and methods have been proposed, including impregnating the surface of materials containing free hydroxyl groups, i.e., cement and lime, with organo-silicon compounds having a hydrophobic effect in order to make the surface of the material water repellent and thus more resistant to the action of the weather. For example, U.S. Pat. No. 4,342,796 discloses methods for retarding the corrosion of reinforcing steel in structural concrete by applying organo-silicon compounds. However, the degree of penetration of water-repellent chemicals into such structures is limited. Since the surfaces of roads and bridges are subjected to wear, this wear can remove any chemical treatment which has not achieved sufficient penetration.

Despite the significant research done in this area, there remains a need for improvements in the economical surface treatment of reinforced concrete and masonry structures, such as bridge decks and concrete paved roadways, which will prevent the premature deterioration of the concrete and masonry and extend the service life of the structures.

SUMMARY OF THE INVENTIVE CONCEPTS

The inventive concepts disclosed and claimed herein generally relate to a process for treating concrete structures. A cost-effective process for treating a concrete structure includes the following steps. A surface of the concrete structure is coated with an organo-silicon compound and a sealant is applied to the organo-silicon coated surface so as to reduce atmospheric exposure of the organo-silicon compound while the organo-silicon compound migrates into the concrete structure.

In one embodiment, a surface of a concrete structure is coated with an organo-silicon compound having at least one of silane and siloxane. A sealant comprising methacrylate, urethane, epoxy, water-based acrylic, solvent-based acrylic, latex paint, or solvent-based paint is applied to the organo-silicon coated surface within 4 hours of coating the surface of the concrete structure with the organo-silicon compound.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction, experiments, exemplary data, and/or the arrangement of the components set forth in the following description, or illustrated in the drawings. The presently disclosed and claimed inventive concepts are capable of other embodiments or of being practiced or carried out in various ways. Also, it is to be understood that the phraseology and terminology employed herein is for purpose of description only and should not be regarded as limiting in any way.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features have not been described in detail to avoid unnecessarily complicating the instant disclosure.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless it is obvious that it is meant otherwise.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

It is known that concrete can be made water-repellent by application of an organo-silicon compound such as a silane or siloxane compound. Such silane and siloxane compounds can often penetrate concrete about ⅛ inch or more and thereafter cause rainwater to bead from the surface of the treated concrete, thereby protecting the concrete and reinforcing steel from moisture and chloride ingress. Regular re-application is necessary, however, due to traffic wear and UV-degradation of the organo-silicon compound.

Surprisingly, it has been found that covering the concrete soon after application of an organo-silicon compound causes a significant increase in the penetration of the organo-silicon compound, resulting in a significant improvement in the effective life of the water-repellency treatment. Deeper penetration of the organo-silicon compound reduces loss by physical wear and also improves the effective life of the organo-silicon compound by reducing contact with UV light. This reduces cost by increasing the useable time between applications. While not wishing to be bound by any particular theory, it is believed that covering the organo-silicon treated surface protects the organo-silicon compounds from both atmospheric moisture and solvent evaporation, thereby increasing the time available for penetration of the concrete.

In general, organo-silicon compounds which can be employed to provide water-repellency for concrete structures can be any organo-silicon compound capable of migrating into the concrete and which can be hydrolyzed within the concrete to form cross-linked polymers containing —Si—O—Si— moieties which can react with the free hydroxyl groups present in the concrete. The compounds are believed to work by binding to the concrete material forming very strong Si—O—Si structures, leaving a very hydrophobic organic tail group to provide the water repellency.

In one embodiment, the organo-silicon compound is a silane. Suitable silanes can be represented by the general formula $R_xSi(R')_{4-x}$ wherein: each R is the same or different nonhydrolyzable aliphatic, cycloaliphatic or aromatic group having from 1 to about 30 carbon atoms; each R' is the same or different hydrolyzable group such as an alkoxy, acetoxy, amine or hydroxyl; and x=1 to 3.

Nonlimiting examples of suitable silanes include methyltrimethoxysilane, ethyltrimethoxysilane, propyltrimethoxysilane, butyltrimethoxysilane, pentyltrimethoxysilane, hexyltrimethoxysilane, octyltrimethoxysilane, methyltriethoxysilane, ethyltriethoxysilane, propyltriethoxysilane, butyltriethoxysilane, pentyltriethoxysilane, hexyltriethoxysilane, octyltriethoxysilane, dimethyldimethoxysilane, isobutyl trimethoxysilane, isobutyl triethoxysilane, isohexyl trimethoxysilane, isohexyl triethoxysilane, isooctyl trimethoxysilane, isooctyl triethoxysilane, and the like.

In another embodiment, the organo-silicon compound is a siloxane. A siloxane is a functional group with an Si—O—Si linkage, but the term "siloxane" is commonly used, and used herein, to refer to the entire organo-silicon compound having such a functional group. Suitable siloxanes can be represented by the general formula:

wherein each R" is the same or different moiety selected from aliphatic, cycloaliphatic and aromatic groups having from 1 to about 30 carbon atoms; and y is an integer of from 2 to about 100.

Nonlimiting examples of suitable siloxanes include polydimethylsiloxane (PDMS), hexamethyl disiloxane, hexaphenyl disiloxane, dimethyltetraphenyl disiloxane, tetramethyldiphenyl disiloxane, α,ω-bis-trimethylsiloxypolydimethyl siloxane, α,ω-bis-trimethylsiloxypolydiphenyl siloxane, α,ω-bis-dimethylvinylsiloxypolydimethyl siloxane, α,ω-bis-triethylsiloxypolydiphenyl siloxane, mixtures of such siloxanes and the like.

The preparation of suitable silanes and siloxanes can be accomplished by generally known methods and many of such compounds are commercially available. Thus, no discussion of the preparation of such organo-silicon compounds is believed necessary.

The organo-silicon compounds employed in the practice of the present invention, and which are in a liquid state, can be applied directly to the surface of the reinforced concrete structure. Thus, in one embodiment, the organo-silicon compound is applied neat (without dilution in a solvent) as a low viscosity liquid.

In another embodiment, the organo-silicon is dissolved or emulsified in a suitable liquid vehicle so that upon application of the organo-silicon to the surface of a reinforced concrete structure the organo-silicon compound is substantially uniformly dispersed over the surface of the structure. Further, the liquid vehicle may assist in the migration of the organo-silicon compound into the interior portion of the structure. The liquid vehicle employed with the organo-silicon compound can be water or a suitable organic solvent. Further, the liquid vehicle should be relatively inert to both the reinforced concrete structure and the organo-silicon compound (i.e., the liquid vehicle should have no adverse effects on either the reinforced concrete structure or the organo-silicon compound).

It was previously considered necessary for the solvent employed to have a very low evaporation rate. However, covering the concrete after application of the organo-silicon compound makes the evaporation rate less critical while still permitting the organo-silicon compound to be spread uniformly over the area being treated, such as a bridge deck, parking garage, or the paved traveling surface of a concrete roadway, and migrate deeper into the interior portion of the structure.

Exemplary organic solvents which can be employed as a liquid vehicle for the organo-silicon compounds are the aromatic or aliphatic organic solvents, including cycloaliphatic hydrocarbon solvents and alcohols, such as toluene, xylene, high boiling naphthas, cyclohexane, tetra-, hydro-, and decahydronaphthalenes, ethanol, propanol, isopropanol, butanol, and the like.

In one embodiment, the surface of the concrete reinforced structure to which the organo-silicon compound is applied is a clean, dry surface. The term "dry" as used herein is understood to mean a substantially moisture-free surface. While some moisture can be present in the concrete or masonry, drier surfaces allow deeper penetration of the organo-silicon compound. In one embodiment, the concrete or masonry has a surface moisture of about 5% or less. The term "clean" as used herein is understood to mean substantially free of excess dirt, hydrocarbon deposits, grease and the like. When the organo-silicon compound is to be applied to a structure, such as a concrete paved roadway, parking garage, or concrete bridge deck, which has had considerable use and contains large amounts of dirt, grease and hydrocarbon deposits thereon, the surface can be mechanically cleaned by any suitable means, such as sand or shot blasting and the like. If water is used in the cleaning operation of the surface of the structure, the surface of the structure is allowed to dry before applying the organo-silicon compound to the cleaned surface.

The organo-silicon compound can be applied to the concrete or masonry using a high pressure spray, low pressure flood coat, or other means known to those skilled in the art. The amount of organic solvent and organo-silicon employed to form the solution for treating the reinforced concrete structure can vary widely depending on the surface to be treated. In one embodiment, the concrete surface to be treated is flood coated with organo-silicon applied at a rate of 80 to 100 sq. ft. per gallon. In another embodiment organo-silicon is applied to a concrete surface at 100 to 250 sq. ft. per gal. In yet another embodiment, the concrete surface to be treated is flood coated with organo-silicon applied at 250 to 500 sq. ft. per gallon and sufficient organo-silicon compound is present to substantially cover the surface of the structure being treated.

Once the organic solvent with organo-silicon is applied to the surface, the organo-silicon treated surface is covered to isolate the treated surface from the atmosphere. Surprisingly, it has been found that organo-silicon penetration improves as the time between the organo-silicon surface treatment and the application of a covering material decreases. In one embodiment, the organo-silicon treated surface is immediately covered to isolate the treated surface from the atmosphere. For example, a covering material or sealant can be applied to the organo-silicon treated surface within 15 or 30 minutes of application of the organo-silicon treatment. In another embodiment, some "soak in" time is allowed for the organo-silicon treated surface to dry before adding the sealant. Thus, the organo-silicon may be allowed to "soak in" for a period of about 1 hour or up to about 4 hours to prior to covering the organo-silicon treated surface with a sealant. A volatile solvent such as acetone can be added to the organo-silicon compound to cause the organo-silicon compound to soak in even faster. In another embodiment, the organo-silicon is allowed to "soak in" for a period of up to about 8 hours prior to covering the organo-silicon treated surface.

It is believed that any means of covering the organo-silicon treated surface, including covering the organo-silicon treated surface with a plastic sheet or an impermeable tarp, will impart a barrier between the organo-silicon treated surface and the atmosphere and provide the environment needed for improved penetration of the organo-silicon compound. If a tarp or plastic sheet is utilized, it can be removed once the desired penetration of the organo-silicon compound is achieved. The time required for the barrier to remain in place and cause improved penetration of the organo-silicon compound will vary greatly. In one embodiment, the barrier remains in place for at least about 30 minutes. In another embodiment, the barrier remains in place for up to about 4 hours. In yet another embodiment, the barrier remains in place for up to about 8 hours before it is removed.

In another embodiment, the organo-silicon treated surface is covered with a dryable or curable liquid sealant. Once dried or cured, the sealant acts to seal cracks in addition to providing the barrier between the organo-silicon treated surface and the atmosphere. Examples of suitable sealants include, but are not limited to, epoxy, acrylics, urethanes or polyurethane, acrylates such as methyl methacrylate, styrene butadiene, acrylic latex, asphalt, latex paint, oil-based paint, and the like.

In one embodiment, an epoxy sealant is applied less than 30 minutes after the organo-silicon compound has been applied. In another embodiment, an epoxy sealant is applied after the organo-silicon compound has been allowed to "soak in" for a period of 30 to 60 minutes. As demonstrated in the following Examples, the optimum time between organo-silicon coating and sealant application depends in part on the temperature and the quantity of organo-silicon coating applied. The timing can also be optimized for both organo-silicon penetration and sealant adherence to the concrete.

In one embodiment, a two-component, low viscosity, epoxy polymer is mixed by batch or continuous methods known to those skilled in the art. The epoxy polymer is formulated to seal cracks and extend the life of concrete surfaces and can be applied as an overlay. The epoxy resin and hardener is mixed with an alcohol or other solvent and applied with a brush, roller, or squeegee, or sprayed with an airless sprayer. The epoxy polymer is spread and allowed to pond over hairline cracks. The low viscosity allows deep penetration into the smallest cracks to provide a protective barrier for the organo-silicon compound, and later to provide a protective barrier against the ingress of water, salts, ions and other waterborne contaminants, thus additionally extending the service life of the concrete structure.

In one embodiment, a skid resistant aggregate or sand can be applied to the surface once the sealant is tacky.

In order to further illustrate the present invention, the following examples are given. However, it is to be understood that the examples are for illustrative purposes only and are not to be construed as limiting the scope of the invention.

Example Set 1

The purpose of this study was to determine the change in penetration of isobutyltrimethoxysilane, IBTMS, due to addition of SIL-ACT™ EP 700D epoxy, and the length of time the blocks are left undisturbed before they were broken for data collection. About 0.88 grams of IBTMS was applied to the surface of each of 21 concrete blocks. This equates to a spreading rate of 250 sq. ft. per gallon of IBTMS.

The blocks were separated into 6 groups of 4 blocks each. Three groups of blocks were coated with epoxy approximately 1 hour after IBTMS was applied. The remaining groups were left without epoxy as control blocks. The blocks were left undisturbed for increasing lengths of time. The data was collected for 1 group of blocks with epoxy and 1 group of blocks without epoxy after 30 days. The data was collected for another 2 groups of blocks with and without epoxy 60 and 90 days after the silane was applied.

The basic procedure involved weighing and labeling the blocks. The blocks were then placed in a TOASTMASTER™ electronic convection oven at 350° F. for approximately 8 hours to dry. After 8 hours the oven was turned off and the blocks were left inside overnight to cool and reach thermal equilibrium. The following morning, the blocks were weighed a second time.

The blocks were individually placed on the scale, the scale was zeroed, and IBTMS was applied using a paint brush in crossing strokes. The target amount of IBTMS to be added to each block was 0.88 grams. The mass of IBTMS actually added was recorded. The blocks were then taped around the edges with masking tape so that there was a small overlap over the top edge of concrete.

The blocks were separated into 6 groups of 4 blocks each. Epoxy was applied to three of the groups approximately 1 hour after IBTMS was applied. The amount of epoxy added was visually sufficient to cover the surface. The remaining groups were not coated with epoxy. The blocks were left undisturbed for increasing amounts of time. The data was collected for 1 group of blocks with epoxy and 1 group of blocks without epoxy after 31 days.

After 31 days, the tape was removed from blocks 1-3 and 13-15. Each block was broken in half then wetted with water where the break occurred. The depth of penetration of the IBTMS was measured by determining where the block was water resistant and that depth was measured with a digital caliper in four places and averaged. The depths were recorded and photos were taken of the wetted blocks. Each block was rubber banded together and stored in an airtight container.

The data was collected for blocks 4-6 and 16-18 after being left undisturbed for 60 days. However, a minor change was made to the procedure of collecting the data. The depth of penetration was measured in 12 places. The depth was measured 1 cm from each edge of the block and then every ½ cm between those measurements. The average of all the measurements was calculated for each block.

The data was collected for blocks 7-9 and 19-21 after being left undisturbed for 90 days. The data collection procedure was the same as for the previous set of blocks. The average of all the measurements was calculated for each block.

The blocks broken after 30 days had an average IBTMS penetration of 12.01 mm without epoxy and 16.84 mm with epoxy. This was a 40% increase in penetration compared to the non-epoxy treated 30 day blocks. The blocks broken after 60 days had an average penetration of 11.48 mm without epoxy and 15.48 mm with epoxy. This was a 35% increase in IBTMS penetration compared to the non-epoxy treated 60 day blocks. The blocks broken after 90 days had an average IBTMS penetration of 10.39 mm without epoxy and 15.86 mm with epoxy. This was a 52% increase in IBTMS penetration compared to the non-epoxy treated 90 day blocks.

Figure 1:
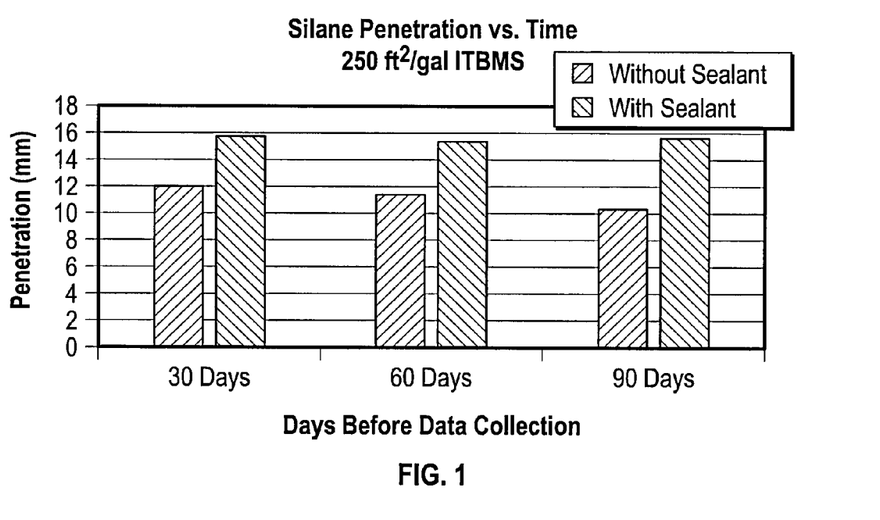
FIG. 1 is a bar graph showing silane penetration versus time for Example Set 1 results using an isobutyltrimethoxysilane (IBTMS) application rate of 250 ft$^2$/gal with and without post application of epoxy.
Figure 2A:
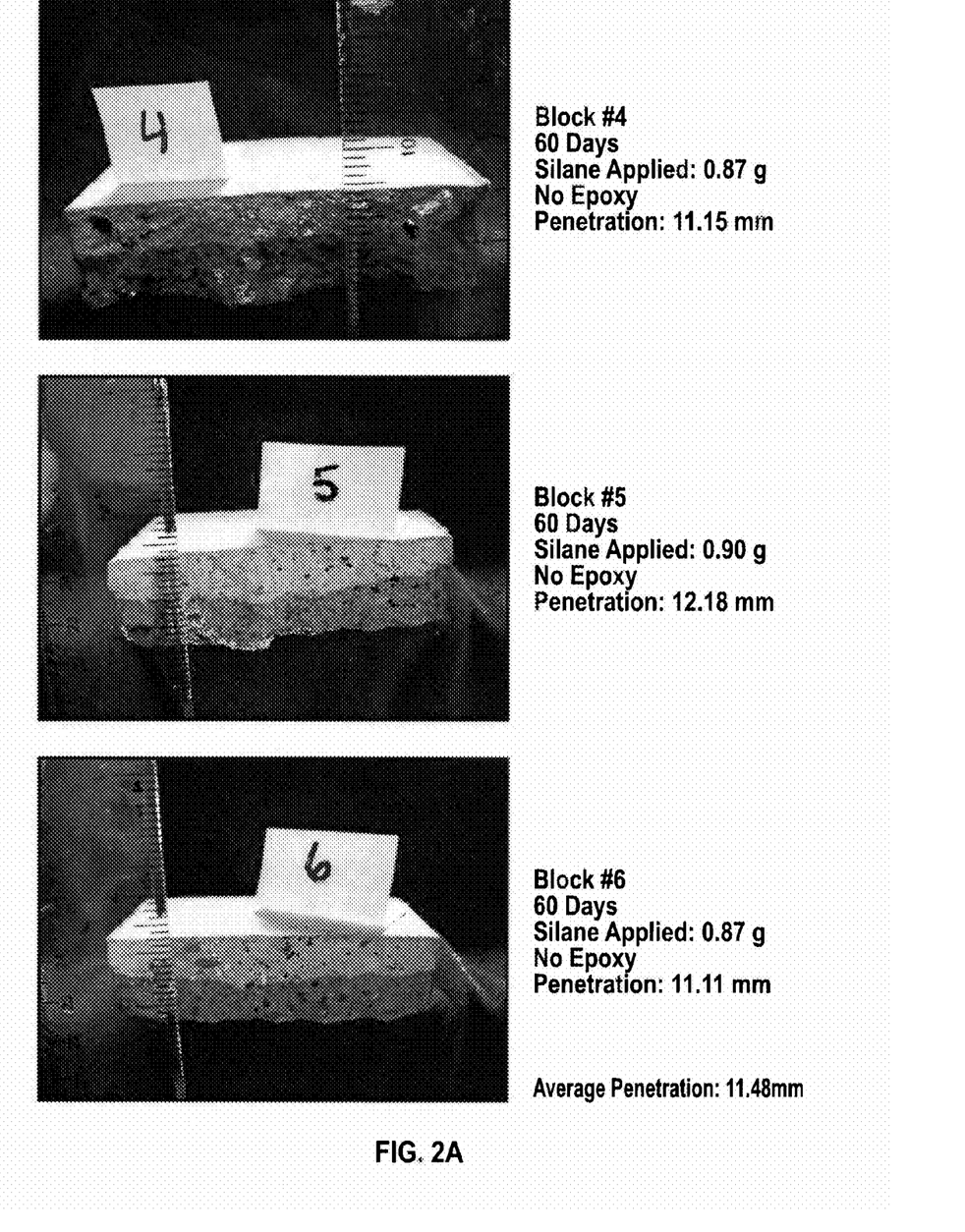
FIG. 2A shows photographs of several Example Set 1 blocks after 60 days with no epoxy coating over the IBTMS.
Figure 2B:
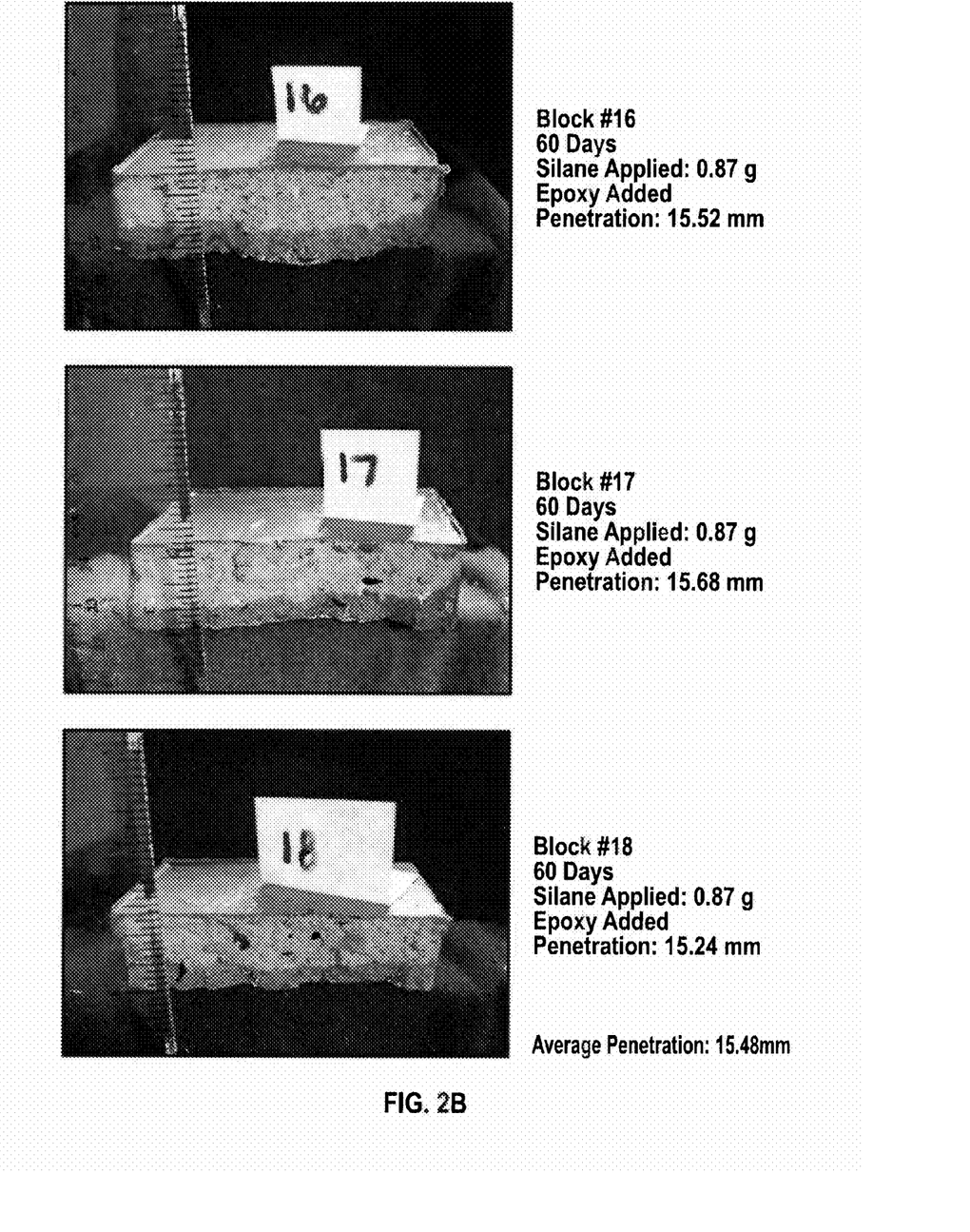
FIG. 2B shows photographs of several Example Set 1 blocks after 60 days, the blocks having been coated with epoxy approximately 1 hour after IBTMS was applied.

The penetration of the silane steadily decreased over time for blocks without epoxy, but remains roughly the same for the blocks with epoxy added. Also, there was significantly more silane penetration in the blocks with epoxy than those without epoxy. The data are summarized in the bar graph in FIG. 1. FIG. 2A shows example photographs of blocks after 60 days, the blocks having been treated with IBTMS at a spreading rate or coverage of 250 sq. ft. per gallon and with no epoxy coating. FIG. 2B shows photographs of blocks after 60 days, the blocks having been treated with IBTMS at a coverage of 250 sq. ft. per gallon and coated with epoxy approximately 1 hour after IBTMS was applied. The increased penetration of IBTMS with the epoxy coating is visually apparent.

Example Set 2

To determine the effect of epoxy coating on IBTMS penetration using lesser amounts of IBTMS, additional tests were conducted using the procedure described in Example 1. In these tests, only about 0.44 grams of IBTMS was applied to each of 28 concrete blocks, which provides a coverage of 500 sq. ft. per gallon IBTMS.

Figure 3:
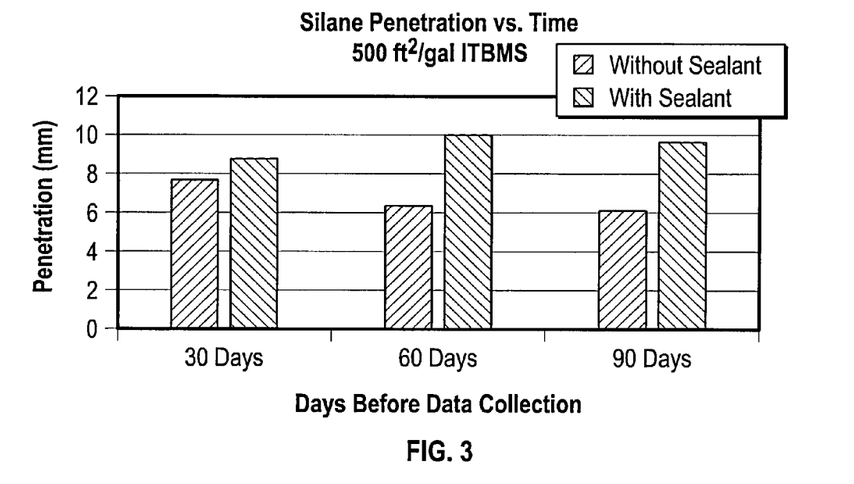
FIG. 3 is a bar graph showing silane penetration versus time for Example Set 2 results using an IBTMS application rate of 500 ft$^2$/gal with and without post application of epoxy.

In this study using lesser amounts of IBTMS, the addition of epoxy increased the depth of penetration of IBTMS an average of 50% compared to IBTMS that was not covered with epoxy. When no epoxy is applied, the depth of penetration decreases over time. However, the penetration of the silane actually appears to increase with time when epoxy is applied. The results are shown in FIG. 3. It should also be noted that this lesser amount of silane (500 sq. ft. per gal) with epoxy achieves the same penetration results after 90 days as using twice as much silane without epoxy (see Example Set 1 results).

Example Set 3

Figure 4:
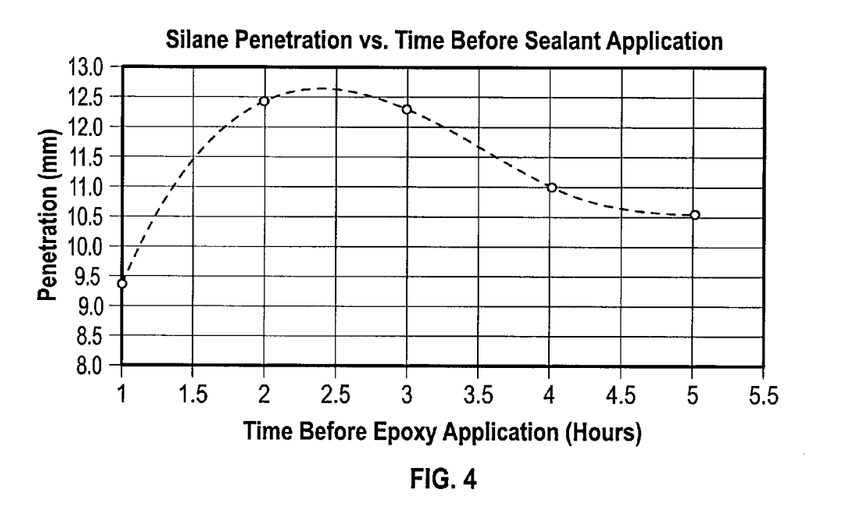
FIG. 4 shows the penetration results of a first series in Example Set 3, wherein sealant was added in time increments between 1 to 5 hours after coating with an organo-silicon compound.

Four series of tests were conducted to determine the effect of temperature, organo-silicon coverage rate, and type of sealant on the optimum time elapsed between application of the organo-silicon compound and application of the sealant. The first series of such tests determined the penetration of isobutyltrimethoxysilane, IBTMS, at a coverage rate of 125 $ft^2$/gallon while varying the amount of time before sealing the block with an epoxy at room temperature lab conditions. This was performed by applying IBTMS to each block and waiting 1, 2, 3, 4, and 5 hours to apply the epoxy to each set of blocks consecutively. The concrete cores were dried in a 250° F. oven for approximately 8 hours. The oven was then turned off and the cores were allowed to cool to room temperature overnight. The diameter of a core was measured using a ruler and the area of the face of the cylinder was calculated. The area of this surface was calculated to be about 51.76 $cm^2$. The addition of approximately 1.55 g of IBTMS resulted in 125 $ft^2$/gallon coverage of the cores. The silane was allowed to dry on the cores for varying amounts of time. Core 2 was allowed to dry for about 1 hour before being coated with EP 700D epoxy. Core 3 was allowed to dry for about 2 hours before epoxy was added, etc. The cores were left undisturbed for 30 days. After 30 days the cores were broken in half using a compression tester. The cores were wetted with water where the break occurred. The depth of penetration of the IBTMS was measured by determining where the concrete was water resistant. This depth was measured with a digital caliper in 10 places, averaged, and recorded. The graph in FIG. 4 shows that the depth of penetration rapidly increases then more slowly decreases. FIG. 4 also shows that the highest penetration occurred when epoxy was added approximately 2.5 hours after the application of IBTMS.

A second series of tests were conducted as above but using less IBTMS and times between silane application and epoxy application of less than 1 hour. Each block was coated with IBTMS at a coverage of 500 $ft^2$/gallon, approximately 0.44 grams. One minute after silane application, 3 blocks were coated with epoxy. Another set of blocks were coated with epoxy at 5, 15, 30, and 45 minutes after silane application. The blocks were allowed to cure for 30 days. After 30 days, the blocks were broken in half and the depth of penetration was measured by wetting the broken edges of the blocks and determining where the block was water resistant.

Figure 5:
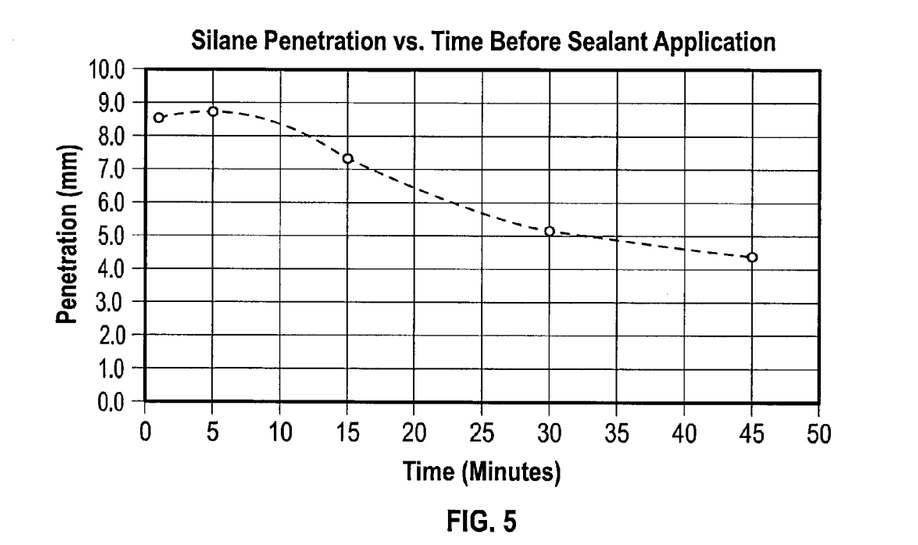
FIG. 5 shows the penetration results of a second series in Example Set 3, wherein sealant was added in time increments up to 1 hour after coating with the organo-silicon compound.

Results are shown in FIG. 5. The sooner the epoxy was applied, the deeper the penetration was compared to the control blocks. Control blocks with no epoxy had an average penetration of 3.6 mm. The blocks that had epoxy applied one minute, five minutes, and 15 minutes after silane application had a penetration more than double that of the control blocks with no epoxy. The blocks that had epoxy applied 30 minutes after the application of silane still had a penetration that was 42% greater than the control block with no epoxy. With this higher silane spreading rate or coverage (lesser silane applied), the sooner the epoxy is applied, the deeper the silane penetrates. It should be noted that very rapid (5 min.) application of epoxy with this lesser amount of silane resulted in nearly the same penetration (9 mm) as when using 4 times the amount of silane and waiting 5 hours before applying epoxy (10.5 mm).

A third series of tests were run to determine the ideal length of time that should be waited between silane application and epoxy application at warmer summer-type temperatures using IBTMS at a spreading rate of 500 ft²/gallon. The blocks were separated into 8 groups of 2 and one block was used as a control that did not have any silane or epoxy applied directly. The concrete blocks were weighed and put in an oven at 350° F. for approximately 6 hours. After 6 hours the oven was turned off and the blocks were allowed to cool overnight. The following morning the blocks were moved to a laboratory oven set at approximately 90° F. The blocks were removed, one at a time, from the oven and weighed. Silane was applied to each block using a sponge brush in crossing strokes, except the block serving as the control. The target amount of silane to be added was 0.44 grams giving a spreading rate of 500 ft²/gal.

Epoxy was not applied to the last group of blocks; these were used as a control set. Epoxy was poured onto the first group of blocks immediately after the silane was applied, approximately 1 minute. The faces of the blocks were still wet and the block still smelled strongly of silane. The epoxy was manipulated until the entire face of the block was covered and the excess was poured off. The blocks were then returned to the oven.

Epoxy was applied to the second group of blocks, in the same manner, when the silane appeared dry and the smell was unnoticeable. Epoxy was applied to the remaining groups of blocks 1, 3, 5, 8, and 24 hours after the silane was applied, respectively. All of the blocks were returned to the oven after epoxy application and allowed to cure in the oven for about 7 days. After 7 days the blocks were removed from the oven and allowed to cure at room temperature until 30 days had passed. After 30 days, the blocks were broken in half and blocks were wetted at the site of the break. The depth of penetration was determined by examining where the block was water repellent. That depth was measured with a digital caliper in 12 places, averaged and recorded.

Figure 6:
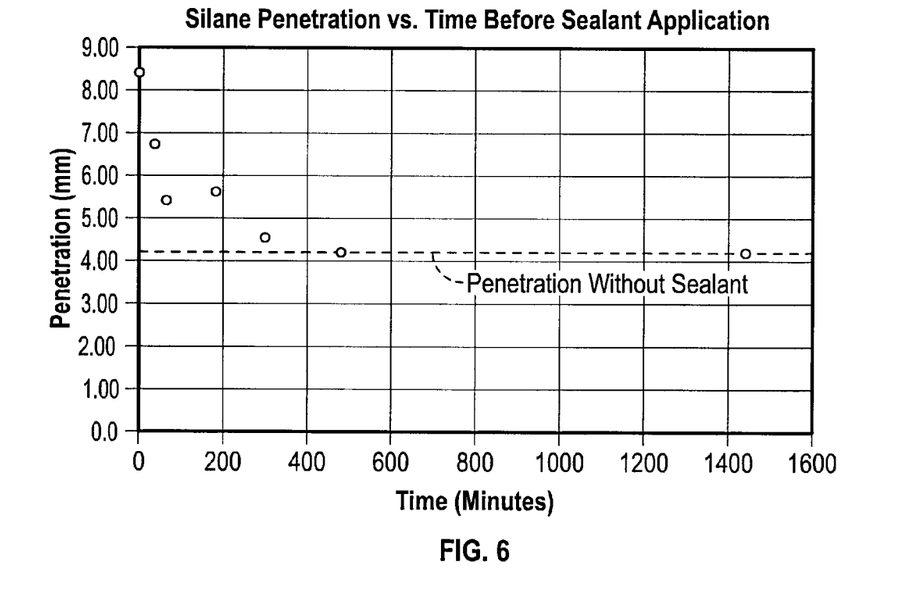
FIG. 6 shows the penetration results of a third series in Example Set 3, wherein sealant was added in time increments at a temperature of 90° F.

The control blocks with no epoxy had an average penetration of 4.19 mm. The set of blocks that had the highest average penetration of IBTMS were the blocks that were coated with epoxy immediately after the silane was applied. The average penetration for this set of blocks was 8.38 mm which is about double the penetration of the control blocks. The relationship between penetration and time between applications is shown in FIG. 6. At the higher 90° F. temperature, application of an epoxy over IBTMS increases the penetration of the silane as long as the epoxy is applied within 8 hours of the application of the silane, and application of epoxy immediately after the silane application results in the deepest penetration. However, this benefit diminished with increasing time between silane application and epoxy application, and became zero when the epoxy was applied more than eight hours after the silane.

Example Set 4

Tests were run to determine the difference in penetration between isobutyltrimethoxysilane, IBTMS, and isobutyltriethoxysilane, IBTES. Experiments were run comparing 100% IBTMS and 100% IBTES applied to blocks at a spreading rate of 500 ft²/gallon. The blocks were separated into 2 groups of 9 blocks each. IBTMS was applied to 9 blocks and IBTES was applied to the other 9. Three blocks from each group were left uncoated for the silane to cure alone. Three blocks from each group were coated with epoxy 15 minutes after the silane was applied. The final 3 blocks from each group were coated with epoxy 45 minutes after the silane was applied. After 30 days, the blocks were broken in half and the depth of penetration was measured by wetting the broken edges of the blocks and determining where the block was water resistant. The depth was measured in 12 places with a digital caliper. The depths were recorded and averaged.

The IBTMS control blocks that were not coated with epoxy had an average penetration of 3.61 mm while the IBTES control blocks that were not coated with epoxy had an average penetration of 3.87 mm.

Figure 7:
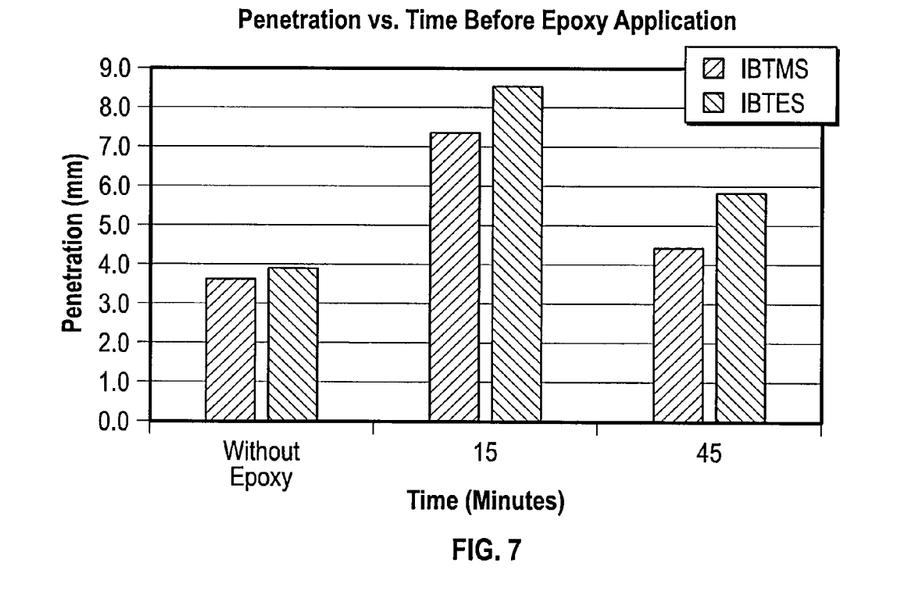
FIG. 7 is a bar graph showing results of Example Set 4 comparing isobutyltriethoxysilane and isobutyltrimethoxysilane with no epoxy coating and with epoxy coating after 15 minutes and after 45 minutes.

The IBTMS blocks that were coated with epoxy 15 minutes after the silane was applied had an average penetration of 7.37 mm compared to 8.56 mm for ITBES. The IBTMS blocks that were coated with epoxy 45 minutes after the silane was applied had an average penetration of 4.43 mm compared to 5.82 mm for IBTES. The results are summarized in FIG. 7, showing that isobutyltriethoxysilane penetrated more deeply into the concrete than did isobutyltrimethoxysilane, and that epoxy coating after 15 minutes was superior to epoxy coating after 45 minutes.

Example 5

The purpose of this experiment is to compare the depth of penetration of various silanes into concrete blocks. The silanes tested were isobutyltriethoxysilane as XIAMETER® OFS-6403; triethoxyoctylsilane as XIAMETER® OFS-6341; N-octyltrimethoxysilane as SIL-ACT™ ATS-100LV; isobutyltrimethoxysilane as SIL-ACT™ ATS-100; 40% isobutyltrimethoxysilane in alcohol as SIL-ACT™ ATS-42; 40% N-octyltrimethoxysilane in alcohol as SIL-ACT™ ATS-42NS; N-octyltrimethoxysilane in acetone as SIL-ACT™ ATS-42A; and 20% N-octyltrimethoxysilane in alcohol as SIL-ACT™ ATS-22. The XIAMETER® silanes can be purchased from Dow Corning Corp. and the SIL-ACT™ silanes were obtained from Advanced Chemical Technologies, Inc. of Oklahoma. The silanes were applied to concrete blocks at 500 ft²/gallon. Each silane has a different density so the mass of silane used to treat the surfaces differed based on the density of the silane.

The blocks were placed in an oven at 350° F. for approximately 8 hours to dry. They were left in the oven overnight to reach thermal equilibrium. The target amount of silane to be added varied for each silane, the desired masses and the masses actually added were recorded, Table 1. The blocks were then taped around the edges with masking tape. After the silanes were dry, approximately 1 hour, 3 blocks in each set were coated with EP 700D epoxy, the remaining 3 blocks in each set were left uncoated. The blocks were left undisturbed for 30 days. After 30 days, the tape was removed from the blocks and they were broken in half. The block was wetted with water where the break occurred. The depth of penetration of each silane was measured by determining where the block was water resistant. That depth was measured with a digital caliper in 12 places and averaged.

The results, summarized in Table 1 below, show that the addition of epoxy increased the depth of penetration in all eight silanes tested. The percent increases for the silanes ranged between approximately 13 to 105%. The average percent increase was approximately 52%.

The average depths of penetration for the silanes that were mixed with alcohols or ketones were smaller when compared to the 100% silanes. However, the addition of alcohol did not appear to have a significant effect on the percent increase in penetration of the silane. The average percent increase in penetration with the addition of epoxy for the 100% silanes was 55%. The average percent increase in penetration with the addition of epoxy for the silanes that were mixed with alcohols or ketones was 50%. Thus a significant increase in penetration can be expected with the addition of epoxy even if the silane has been blended with alcohols or ketones.

TABLE 1

Comparison of Various Silane Treatments with and Without Epoxy Sealant

| Silane | Penetration w/o Epoxy, mm | Penetration with Epoxy, mm | % Increase |
|---|---|---|---|
| Isobutyltriethoxysilane | 4.08 | 7.20 | 76.6 |
| Triethoxyoctylsilane | 3.53 | 5.00 | 41.8 |
| N-Octyltrimethoxysilane | 2.07 | 3.45 | 66.3 |
| Isobutyltrimethoxysilane | 3.03 | 4.09 | 35.2 |
| 40% Isobutyltrimethoxysilane in Alcohol | 1.91 | 2.16 | 13.1 |
| 40% N-Octyltrimethoxysilane in Alcohol | 1.50 | 2.11 | 40.4 |
| 40% N-Octyltrimethoxysilane in Acetone | 1.37 | 2.80 | 104.7 |
| 20% N-Octyltrimethoxysilane in Alcohol | 1.51 | 2.14 | 41.6 |
|  |  | Avg. % Inc. | 52.5 |

Example 6

To test the applicability of siloxane coatings and water-based silane/siloxane emulsions, SILBLOCK™ WA, SILBLOCK™ WMS in water, and SILBLOCK™ WMS neat were applied at a spreading rate of 500 ft$^2$/gallon. The emulsions are available from Momentive Performance Materials, Inc. and were mixed in the laboratory and applied using a sponge brush.

SILBLOCK™ WA is an aqueous siloxane/alkoxysilane emulsion in water. The SILBLOCK™ WA was made by adding 11.80 g of SILBLOCK™ WA raw ingredient and 88.05 g of tap water to a glass jar. The mixture was shaken well before application. This emulsion was about 11.5% emulsion and 88.5% water by weight so it was approximately 7.0% active.

The SILBLOCK™ WMS is an aqueous 40% silane emulsion. The emulsion was tested neat, without further dilution, and was shaken well before use. SILBLOCK™ WMS "with water" was made by adding 17.27 g of SILBLOCK™ WMS raw ingredient and 81.98 g of tap water to a glass jar. The mixture was shaken well before application. This emulsion was about 17.5% emulsion and 82.5% water by weight so it was approximately 7.0% active.

Figure 8:
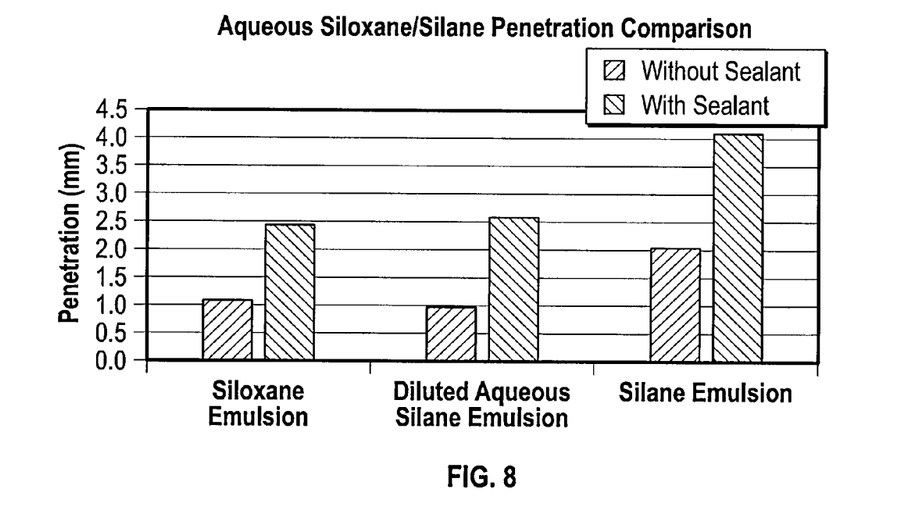
FIG. 8 shows results of Example Set 6 using aqueous emulsions of siloxane and silane.

As shown in FIG. 8, the addition of epoxy sealant over the emulsion application caused a significant increase in penetration of all of the silane/siloxane emulsions tested. Also, it is worth noting that the SILBLOCK™ WMS that was mixed with water in a 4 to 1 ratio and coated with epoxy had more penetration than the pure WMS without epoxy. This means that use of an epoxy sealant provided more penetration with only approximately ¼ the amount of the emulsion than when the 100 percent emulsion was used without sealant.

Example 7

To test the applicability of other epoxy sealers and non-epoxy sealers, a series of tests were run testing paraffin wax, 4 different epoxy formulations, 2 acrylic formulations, 2 polyurethane formulations, latex, methacrylate, and tape with plastic wrap. The epoxy formulations tested were AKASEAL™ from Axson Technologies, SIL-ACT™ EP 500 and SIL-ACT™ EP 700D, each from Advanced Chemical Technologies, Inc. of Oklahoma, and RUST-OLEUM® water based epoxy. The acrylic formulations were ACT™ Thermoplastic from Advanced Chemical Technologies, Inc. of Oklahoma and H&C™ Silicone Acrylic Concrete Sealer. Polyurethane samples tested were ROADWARE 10 MINUTE CONCRETE MENDER™ and VULKEM® urethane deck sealer. The lacquer tested was GEMINI GEM COAT® Satin White Lacquer. The methacrylate tested was KBP 204 P SEAL™, a high molecular weight methacrylate monomer.

The blocks were dried as described above and 0.44 g IBTMS was added to the top of each. The silane-treated blocks were allowed to cure for 1 hour and then taped around the edges so there was a small overlap around the top of the block. The blocks were then coated with the test sealing material with an amount sufficient to visually provide coverage, and placed on a shelf and left undisturbed for 29-31 days. Exceptions to this procedure were that methacrylate sealant test blocks were placed on the shelf for only 15 days, and one group of blocks was sealed with methacrylate after only 15 minutes of silane treatment.

After the allotted time, the tape was removed from the blocks, they were broken in half, and each block was wetted with water where the break occurred. The depth of penetration of the IBTMS was measured by determining where the block was water resistant and that depth was measured with a digital caliper in 12 places.

Figure 9:
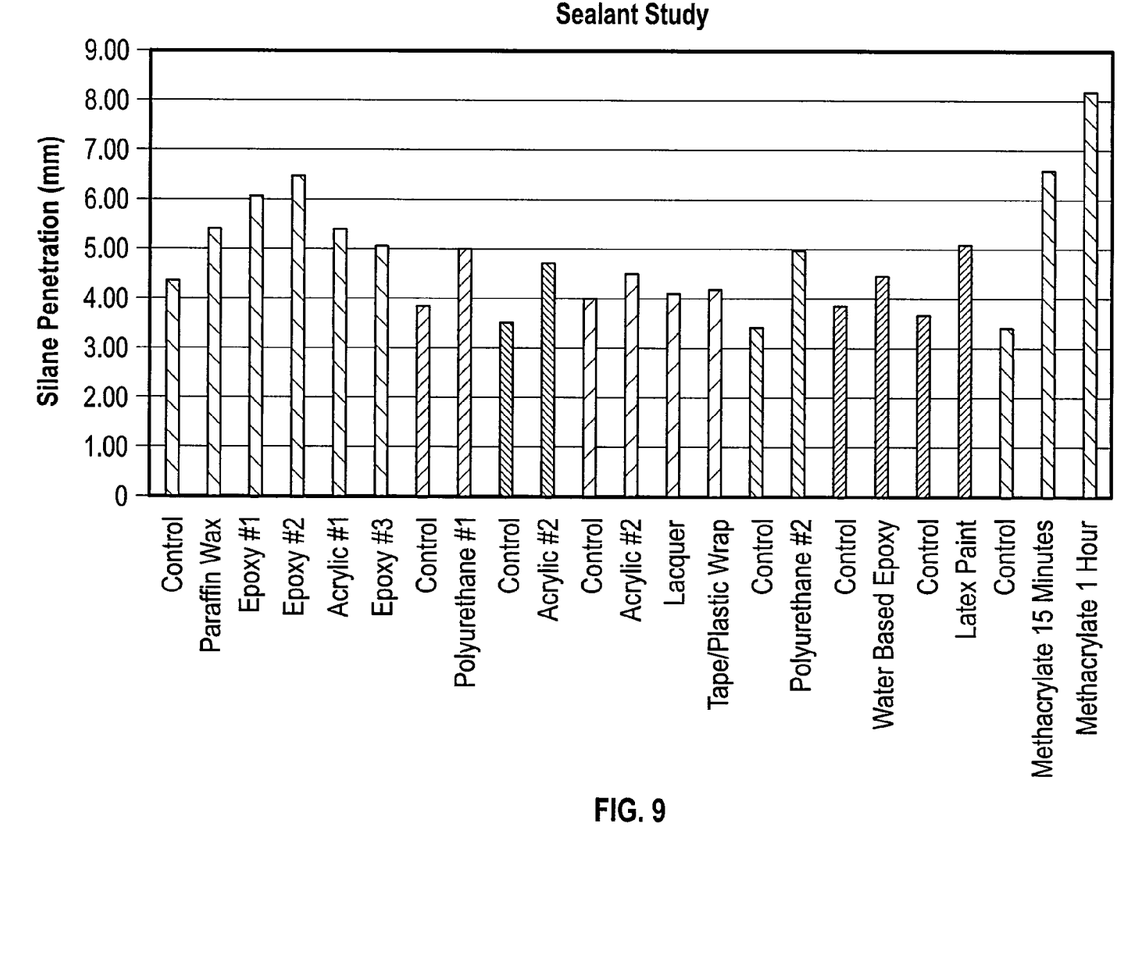
FIG. 9 shows results of Example Set 7 comparing different sealants applied within one hour of coating with silane.

The results are shown in FIG. 9 and indicate that sealing the organo-silicon treated concrete with an airtight coating or a coating that soaked into the concrete, such as some of the thinner epoxies, significantly increased the penetration of the IBTMS. The penetration was increased anywhere from 2% to well over 100% depending on the coating applied. The highest penetration was achieved using methacrylate. The thinner epoxies increased the penetration of the silane more than more viscous epoxies, however each sealant, when applied within one hour of the organo-silicon coating resulted in increased organo-silicon penetration.

From the above description, it is clear that the inventive concepts disclosed herein are well adapted to carry out the objects and to attain the advantages mentioned herein as well as those inherent in the inventive concepts disclosed herein. While exemplary embodiments of the inventive concepts disclosed herein have been described for purposes of this disclosure, it will be understood that numerous changes may be made which will readily suggest themselves to those skilled in the art and which are accomplished without departing from the scope of the inventive concepts disclosed herein and defined by the appended claims.

What is claimed is:

1. A process for treating a concrete structure comprising the steps of:
   (a) coating a surface of a concrete structure with an organo-silicon compound; and
   (b) applying a sealant to the organo-silicon coated surface while the organo-silicon compound migrates into the concrete structure.

2. The process of claim 1, wherein the organo-silicon compound comprises at least one of a silane and a siloxane.

3. The process of claim 1, wherein the organo-silicon compound comprises one or more silanes selected from the group consisting of methyltrimethoxysilane, ethyltrimethoxysilane, propyltrimethoxysilane, butyltrimethoxysilane, pentyltrimethoxysilane, hexyltrimethoxysilane, octyltrimethoxysilane, methyltriethoxysilane, ethyltriethoxysilane, propyltriethoxysilane, butyltriethoxysilane, pentyltriethoxysilane, hexyltriethoxysilane, octyltriethoxysilane, dimethyldimethoxysilane, isobutyl trimethoxysilane, isobutyl triethoxysilane, isohexyl trimethoxysilane, isohexyl triethoxysilane, isooctyl trimethoxysilane, and isooctyl triethoxysilane.

4. The process of claim 1, wherein the organo-silicon compound comprises one or more siloxanes selected from the group consisting of polydimethylsiloxane, isobutyl trimethoxysilane, isobutyl triethoxysilane, n-octyltrimethoxysilane, and n-octyl triethoxysilane.

5. The process of claim 1, wherein the organo-silicon compound is applied neat to the concrete structure surface.

6. The process of claim 1, wherein the organo-silicon compound is present in an organic solvent comprising alcohol.

7. The process of claim 1, wherein the organo-silicon compound is applied to coat 50 to 1000 square feet the surface of the concrete structure per gallon of the organo-silicon compound.

8. The process of claim 1, wherein the organo-silicon compound is applied to coat 100 to 500 square feet the surface of the concrete structure per gallon of the organo-silicon compound.

9. The process of claim 1, wherein the organo-silicon compound comprises isobutyltrimethoxysilane, and the organo-silicon compound is applied to coat and 100 to 500 square feet the surface of the concrete structure per gallon organo-silicon compound.

10. The process of claim 1, wherein the sealant comprises at least one of a methacrylate, urethane, epoxy, water-based acrylic, solvent-based acrylic, latex paint, and solvent-based paint.

11. The process of claim 1, wherein the sealant comprises a methacrylate.

12. The process of claim 1, wherein the sealant comprises a mixture of epoxy resin and hardener.

13. The process of claim 1, wherein the sealant is applied within 8 hours of coating the surface of the concrete structure with the organo-silicon compound.

14. The process of claim 1, wherein the sealant is applied within 4 hours of coating the surface of the concrete structure with the organo-silicon compound.

15. The process of claim 1, wherein the sealant is applied within 1 hour of coating the surface of the concrete structure with the organo-silicon compound.

16. The process of claim 1, wherein the sealant is applied within 30 minutes of coating the surface of the concrete structure with the organo-silicon compound.

17. The process of claim 1, wherein the sealant is applied within 0-15 minutes of coating the surface of the concrete structure with the organo-silicon compound.

18. A process for treating a concrete structure comprising the steps of:
 (a) coating a surface of a concrete structure with an organo-silicon compound comprising at least one of a silane and a siloxane; and
 (b) applying a sealant to the organo-silicon coated surface within 8 hours of coating the surface of the concrete structure with the organo-silicon compound, wherein the sealant comprises at least one of a methacrylate, urethane, epoxy, water-based acrylic, solvent-based acrylic, latex paint, and solvent-based paint.

19. The process of claim 18 wherein the sealant is applied to the organo-silicon coated surface within 4 hours of coating the surface of the concrete structure with the organo-silicon compound.

20. The process of claim 18 wherein the sealant is applied to the organo-silicon coated surface within 1 hour of coating the surface of the concrete structure with the organo-silicon compound.

21. The process of claim 18 wherein the sealant is applied to the organo-silicon coated surface within 0.5 hour of coating the surface of the concrete structure with the organo-silicon compound.

22. The process of claim 18 wherein the sealant comprises a methacrylate.

23. The process of claim 18 wherein the sealant comprises an epoxy.

* * * * *